United States Patent
Moravcik

(12) 
(10) Patent No.: US 8,400,681 B1
(45) Date of Patent: Mar. 19, 2013

(54) ENHANCED HALFTONE SCREENING METHOD FOR THE DRY OFFSET PRINTING PROCESS

(76) Inventor: Girard J. Moravcik, Medina, OH (US)

(*) Notice: Subject to any disclaimer, the term of this patent is extended or adjusted under 35 U.S.C. 154(b) by 893 days.

(21) Appl. No.: 12/482,164

(22) Filed: Jun. 10, 2009

(51) Int. Cl.
*G06K 15/00* (2006.01)
*B41M 1/14* (2006.01)

(52) U.S. Cl. ...... 358/3.06; 358/1.9; 358/3.01; 358/3.07; 358/3.1; 358/3.2; 358/3.21; 358/3.22; 358/534; 358/536; 101/22; 101/23; 101/49; 101/52; 101/171; 101/211; 101/248; 101/484; 101/492

(58) Field of Classification Search ................ None
See application file for complete search history.

(56) References Cited

U.S. PATENT DOCUMENTS

| | | | | |
|---|---|---|---|---|
| 4,998,962 A | * | 3/1991 | Edwards | 101/211 |
| 5,010,814 A | * | 4/1991 | Shishikura | 101/211 |
| 5,463,417 A | * | 10/1995 | Yamakawa | 347/212 |
| 5,806,426 A | * | 9/1998 | Choulet | 101/211 |
| 6,020,108 A | * | 2/2000 | Goffing et al. | 430/306 |
| 6,194,125 B1 | * | 2/2001 | Goffing et al. | 430/306 |
| 2007/0062397 A1 | * | 3/2007 | Gydesen | 101/424.1 |
| 2009/0262179 A1 | * | 10/2009 | Blum et al. | 347/240 |

* cited by examiner

*Primary Examiner* — Steven Kau
(74) *Attorney, Agent, or Firm* — Gold & Rizvi, P.A.; Glenn E. Gold

(57) ABSTRACT

A method of file preparation, ripping and plate making for high end graphics printed on cylindrical products utilizing Dry Offset printing presses. While utilizing two inverse angle techniques and one fixed angle on the Black, with virtually unlimited color pluralities, encompassing a majority of all open areas of the common printing blanket without any ink overlap. The nesting of the halftone dots at even coarse line screen rulings eliminating a dot rosette pattern and creating a continuous tone appearance. Print contrast is increased to that of offset printing quality and ink contamination over the course of the run length is virtually eliminated. This current invention also increases the ability to print white with colors as opposed to needing white coating done in advanced to transparent plastics and metallic surfaces.

9 Claims, 15 Drawing Sheets

ENHANCED HALFTONE SCREENING METHOD FOR THE DRY OFFSET PRINTING PROCESS

BACKGROUND OF THE INVENTION

1. Field of the Invention

The present invention relates generally to Dry Offset printing. More particularly, the invention relates to an enhanced halftone screening method for the Dry Offset printing process.

2. Discussion of the Related Art

The Dry Offset Printing process (sometimes referred to as "Letterset" and "Indirect Relief Printing") is an offset printing process combining the characteristics of letterpress and offset. Dry Offset printing is similar to offset lithography in that a rubber blanket is used to transfer the image from the printing plate to the container surface. As in the letterpress, the plate used has the image area raised above the surface of the plate Ink is distributed through a series of rollers onto the raised surface of the plate.

The plate transfers the image to the rubber blanket, which prints the entire multicolored copy taken from one or more (i.e., up to ten) color plate cylinders on the container in a single operation. The "Dry" denotation of this offset system serves to differentiate it from the offset system, which uses the incompatibility of water inks to "dampen" the surface of the plate or substrate to prevent ink transfer.

Dry Offset Printing provides the most efficient method for high speed, large volume printing of multi-colored line copy, half-tones and full process art on round, or cylindrical, three dimensional products—such as preformed plastic parts. Dry Offset printing is used primarily to print on products such as tapered cups, tubs and pails, beverage cans, as well as tubes, jars and their respective closures (i.e., caps and lids).

The colors used in offset printing are usually Cyan, Magenta, Yellow and Black (conventionally denoted as "CMYK"). Different percentages of each of these four colors create virtually every color used in offset printing. There are color matching systems, such as the Pantone® system, that allow print buyers to see the color. The code for that color can be entered into the offset printer's computer and it will calculate the percentage of each color to use. Although the specification makes specific reference to the Pantone color matching system, it will be apparent to those skilled in the art of Printing that the methods of the present invention could be employed with other color space system as well.

During the process, ink from an ink fountain is transferred, via a set of rollers, to a relief printing plate having the image area raised above the surface of the plate. Each color used in the job has a separate printing plate. The ink from each printing plate is transferred to a common rubber blanket. Each printing plate color is transferred on top of the preceding color. For example, in the case of a 4-color print job (e.g., Yellow, Red, Blue and Black), the Yellow ink transfers from the plate to the rubber blanket first. Then, the blanket moves forward to receive the ink from the Red plate, and so on. Once the final color, Black, is transferred on top of the other colors on the blanket, the blanket transfers all of the colors simultaneously to the print surface of the round container, where the ink is then cured or dried by either ultra violet lights or an oven.

All colors are transferred in a wet state on top of each other on the common blanket. This causes two major problems: (1) a loss of print contrast; and (2) ink contamination. The loss of print contrast causes the image to look flat, muddy, and lacking brilliant bright color. The ink contamination is caused by the relief plate picking up some of the ink from the blanket of the previous color. This causes the color contaminate to migrate back through the ink rollers to the ink fountain, changing the hue and contaminating the ink purity over the course of the run length.

Current screening technology utilizes four common printing angles. These angles are generally: 45°, 75°, 90° (or 0°), and 105° (or 15°); or, in the case of Flexographic printing, these same angles offset by 7.5°. Each color is assigned a different angle, so that when all four colors are transferred on to the product there will be no offensive pattern such as a moiré (see FIG. 2). However, there is still a less offensive pattern that occurs, commonly referred to as a rosette pattern (see FIG. 3). When each color is screened with one of the four angles, the rosette displays a circle with different color dots overlapping one another. This problem is compounded further when more than four colors are needed. The overlap of the colored dots is the cause of ink contamination. The rosette pattern becomes much more visible the coarser the line screen ruling. An 85-line screen (i.e., 85 dots per square inch)—which is not uncommon in Dry Offset printing—will display a considerable rosette pattern and a substantial loss of fine image detail. Frequency Modulated (FM) Stochastic Screening, which is a random pattern of variable size and irregular shaped dots, has also been tried—to no avail. More detail has been seen with less moirés and less rosette patterns; however, ink contamination and print contrast have remained very poor. The finer stochastic dots also make it virtually impossible to control print consistency over the course of the run length.

Current known technology involved in screening for Dry Offset Printing falls far short of what is desired in the printing community. U.S. Pat. No. 5,010,814 to Shishikura discloses a method of non-overlap, halftone-dot printing of a colored original on the outer surface of a cylindrical container via dry off-set printing. A colored original is color-separated into three primary colors (i.e., Cyan, Magenta and Yellow), and change-to-halftone is performed to give an effect of contact screening with the same angle for the individual separated primary colors. One pixel of print is expressed by three colors at most, i.e., one of the three primary colors, one of three secondary colors, i.e., Cyan-Magenta, Magenta-Yellow and Yellow-Cyan blend colors, and Black. This technology does not allow for maximization of ink on the blanket. Furthermore, it utilizes many extremely small circular slices abutting each other with no gap in between, causing press gain issues, ink contamination and registration problems, resulting in an undesirable grainy look. Additionally, the technology is limited to seven colors (i.e., geared to C, M, Y, CM, MY, YC, and K) and the way that the color Black is created results in a very limited range and detail vis-à-vis the present invention. U.S. Pat. No. 4,998,962 to Edwards discloses a method of printing with at least two printing plates, or their equivalent, wherein associated halftone dots belong to two distinct pluralities, each of which is printed with one of the two printing plates, and each of which are interleaved with the other and printed in a color different from the other, separated by a gap when printed in perfect registration. This technology creates a gap between the overlapping dots, does not replace the color lost from the clipping off of the overlap, does not create a continuous tone look, does not eliminate the rosette pattern, and is extremely limited in the number of colors that can be used.

Yet another known technology is a Dry Offset printing process using a printing apparatus including at least one inker block, each block inking a relief plate corresponding to one color of the final motif to be reproduced on an object, including an inker and a succession of transfer rollers, and a central blanket which can be placed into contact with the object to be decorated. An ink of suitable tackiness is selected, and the temperature of the ink is regulated in the inker to a predetermined temperature between 15° C. and 30° C.

Another existing technology comprises a Dry Offset printing apparatus for high speed printing on cylindrical objects fed either horizontally or vertically to the printer, including a three-roller system having a single roll ink-metering system, plate cylinder, and blanket or print roll. The ink roll is provided with a relatively soft, smooth elastomeric surface, as is the offset print roll blanket. A doctor blade is configured and oriented with respect to the ink roll to meter a uniformly even, thin film of ink onto the roll. Means are provided for evenly distributing the ink film on the ink roll in both horizontal and vertical embodiments of the printer. Means are also provided to prevent excessive ink buildup on print roll when skips occur at the printing station. Rotary transfer means are provided for positively feeding the cylindrical objects to the printer at high speeds in either horizontal or vertical orientation.

The above cited technologies do not solve the problems posed and explained above; therefore, a reliable and repeatable screening method for the Dry Offset printing process capable of addressing the above mentioned problems is still desired.

SUMMARY OF THE INVENTION

Various features and advantages of the invention will be set forth in part in the following description, or may be obvious from the description, or may be learned from practice of the method of the present invention.

In one general aspect, a halftone screening method for Dry Offset printing includes a method of converting an original customer-supplied file into a desired continuous tone color space, comprising the steps of:
- converting the a file image and page geometry from CMYK to RGB;
- converting the RGB back to CMYK or Pantone colors with maximum ink density and no under color removal (UCR);
- converting the RGB to CMYK or Pantone again, but with maximum Gray Component Replacement (GCR); and
- combining the colors from the second and third conversion steps.

In another general aspect, the halftone screening method for Dry Offset printing further includes a method for applying Stealth Screening to continuous tone images, comprising the steps of:
- opening an image with a retouching software;
- converting the image to a bitmap, using a 45° print angle for Black and using a 75° print angle for non-Black colors, such that all image locations are composed of a combination of two Primary colors and Black;
- processing a first one of the two Primary colors as if it were Black, but using a 75° print angle;
- inverting a second one of the two Primary colors in a continuous tone format;
- bitmapping the second Primary color at a 75° print angle;
- re-inverting the second Primary color and stacking the colors from lightest to darkest while knocking out the underlying lighter color.

In another general aspect, the halftone screening method for Dry Offset printing further includes a method for applying Stealth Screening to both continuous tone images and page geometry, comprising the steps of:
- processing a page file through a Raster Image Processor (RIP) as a negative continuous tone 8-bit file at a desired resolution;
- determining whether or not plate reduction curve or proof dot reduction curve are required and, if so, applying same;
- changing the RIP parameters to a positive continuous tone 8-bit file at the same desired resolution and re-processing the page file; and
- determining, again, whether or not plate Reduction curve or proof dot reduction curve are required and, if so, applying same.

In another general aspect, the halftone screening method for Dry Offset printing further includes a method for combining the Stealth screening applied to just the continuous tone images and the Stealth screening applied to both the continuous tone images and the page geometry, comprising the steps of:
- building a file that is a combination of the positive continuous tone 8-bit files;
- coloring the positive 8-bit Black-and-White continuous tone files to the appropriate Pantone colors;
- layering the colors from lightest to darkest;
- confirming that all colors are Over Print (OP) and not Knocked Out (KO) of the other colors;
- building a file that is a combination of the negative continuous tone 8-bit files;
- coloring the negative 8-bit Black-and-White continuous tone files to the appropriate Pantone colors;
- layering the colors from lightest to darkest; and
- confirming that all colors are Over Print (OP) and not Knocked Out (KO) of the other colors.

In another general aspect, the halftone screening method for Dry Offset printing further includes a method for building a final file to be used to construct printing plates, comprising the steps of:
- matching up the Pantone colors into predetermined, appropriate color pairs;
- assuming that a first color of the color pair must be printed at a 75° angle and a second Stealth color of the color pair must be printed using an inverse 75° angle;
- determining which colors are to be printed at the 75° angle and which colors are considered to be Stealth colors to be printed at the inverse 75° angle;
- re-processing the negative continuous tone colored and layered file as a negative 1-bit Tiff screened at the inverse 75° angle for the Stealth colors and a 45° angle for Black;
- re-processing the positive continuous tone colored and layered file as a positive 1-bit Tiff screened at the 75° angle for the non-Stealth colors and a 45° angle for Black;
- coloring the Stealth colors from the screened 1-bit Tiff negatives the appropriate colors;
- coloring the non-Stealth colors and Black from the screened 1-bit positives the appropriate colors;
- combining the positive and negative 1-bit screened files to construct a final file; and,
- proofing and using the final file to construct printing plates.

Another aspect provides for the use of coarser line screen rulings, while attaining the look of fine line screen rulings. Coarser line screen rulings allow for more consistent print characteristics—especially on older or faster moving equipment.

A further aspect is the elimination of the common rosette pattern common in the printing process, thereby creating a virtually continuous tone look even at coarse line screen rulings.

An additional aspect is the ability to fill virtually any and all openings on the blanket with pure uncontaminated ink, maximizing color transfer to the product even when during lighter density runs (i.e., reduced ink film thickness).

Another aspect is the substantial increase in print contrast, primarily due to the maximization of ink transfer from the blanket to the product by positioning the halftone dots in the blank areas previously left open in current technology.

An additional aspect is the increase in print contrast and color vibrancy, since there is no need to print multiple wet ink colors on top of each other to create needed color hues of the image, thereby eliminating partial ink transfer and color contamination.

A further aspect is the improved print contrast resulting from the use of the full range Black replacing all other unwanted colors. This Black color, carrying the shading detail to the primary color hues, is completely neutral. The Black halftone dots print entirely on the blanket, knocking out any underlying colors Still another aspect eliminates the need to use illustration-type color or art work, previously required as a result of restrictions of existing prior Dry Offset printing processes. The novel method enables successful reproduction of photographic type art work and images using Dry Offset printing.

Yet another aspect is the ability to print white with other colors while avoiding ink contamination, thereby achieving print quality results rivaling the printing quality of base-coated products that are colored or metallic.

Still a further aspect is the attainment of a dry-offset printing result that far exceeds the current level of quality associated with existing Dry Offset Printing processes, providing results rivaling those typically only attainable using much more expensive print processes, such as In Mold Labeling, Heat Transfer and Shrink Label processes utilized for plastic cylindrical containers.

The present invention, alternatively referred to herein as Stealth Screening, eliminates the occurrence of rosette patterns, color overlapping and ink contamination, while maximizing the ink coverage on the blanket. In turn, the method results in improved print contrast, intensified color, and a vibrant continuous tone high definition image appearance—even at coarse line screen rulings and that remains consistent over the course of the print run length.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

Shown throughout the Figures, the invention is directed to a novel method of screening, alternately referred to herein as Stealth™ Screening or the Stealth™ process, that redefines the limits of Dry Offset print quality. The unique screening method enables Printers to achieve continuous tone results even when using coarse line screening. The method eliminates wet-trapping of inks and the inherent contaminants, provides more ink to the substrate, resulting in unmatched print contrast; and creates high fidelity color separations using Pantone colors, while achieving photographic quality and offset results. The Pantone Matching System (PMS) is a well known proprietary color space used in the printing industry. While reference is made herein to the Pantone system, it will be apparent to those skilled in the printing art that the method(s) of the present invention are adaptable for use with other color space systems as well.

Figure 1:
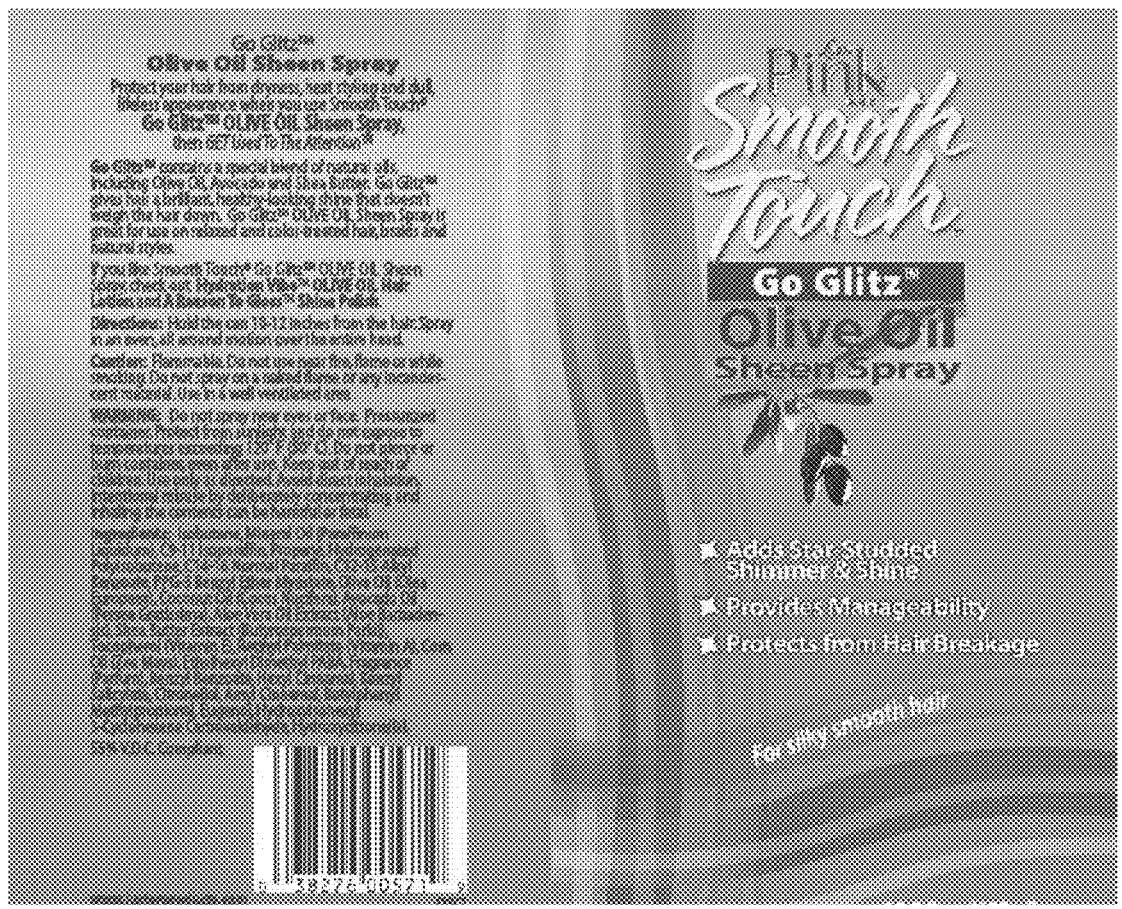
FIG. 1 is a photographic illustrative example of a relatively complex multi-colored artwork, typically supplied as CMYK requiring conversion to six colors to print in the Dry Offset process.

Generally, "halftone" is the reproduction of continuous tone images, through a screening process, which converts the image into dots of various sizes from 0 to 100 per color and equal spacing between centers, or dots of equal size with variable spacing between them. In order for photographs to reproduce well on a halftone device like a printing press, they need to be converted to a halftone. The positions of the halftone dots are calculated by the number of colors that are in close proximity and the hue/lightness/saturation of the ink hues chosen to reproduce the image or graphics for the Dry Offset printing process. This process is utilized when more than one color of ink is needed to reproduce any area of an image or graphics for the Dry Offset printing process (see FIG. 1). To perform the method of the present invention, a currently available Raster Image Processor (RIP) is needed with the ability to process an image and page geometry to a 1-bit Tiff format (e.g., Adobe Photoshop™ software, Esko Backstage™ software, etc.). The RIP is not manufacturer-specific and can be performed on any equipment that has 1-Bit and 8-Bit TIFF (Tagged Image File Format) processing ability.

In the present case, a series of steps, in a particular priority, and particular settings of existing raster image processors, are combined. Only portions of the each processing step are used, sequential layering is critical, as well as opacity and transparency. When completed the image and page geometry will generally have only two specific angles (i.e., not the more conventional four angles), will not have any touching or overlapping of different color dots under 50%, will not have any overlap of different color dots over 50%, and will not have any rosette patterns—which are commonly seen in the conventional known printing and proofing process.

Initial File Conversion to Appropriate Continuous Tone Space

Figure 10:
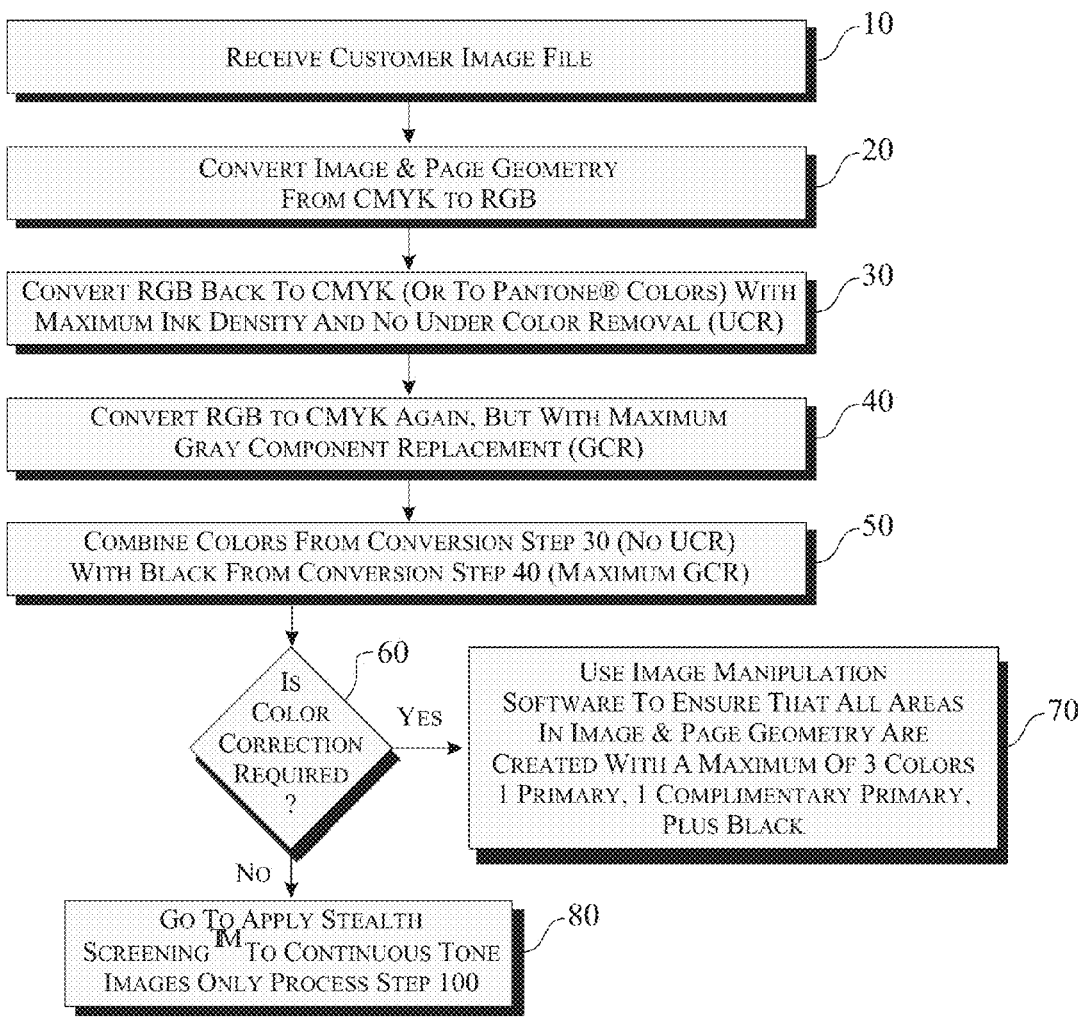
FIG. 10 is a flow chart showing exemplary steps for converting an original customer-supplied file into a desired continuous tone color space.

Referring initially to FIG. 10, the original customer supplied file is received in step 10. Subsequently, the image and page geometry are converted from Cyan/Magenta/Yellow/Black (CMYK), an industry standard, into a Red/Green/Blue (RGB) color space, in step 20. The new RGB image is then converted back to CMYK (or Pantone colors) with maximum ink density and no Under Color Removal (UCR), in step 30. In 4-color (or more) printing, Under Color Removal (UCR) is the process of eliminating amounts of Yellow, Magenta and Cyan that would have added to a neutral Gray, dark-colored shadows and Blacks, and replacing them with Black ink during the color separation process. With current ink technology, the total CMYK ink in the shadows will not adhere after it reaches the dark shadows, and consequently begins to peel off. To prevent this, printers developed the UCR process, in which neutral shadows—which would have normally been produced by printing the primary colors (Cyan, Magenta and Yellow)—are replaced with Black. Next, in step 40, the RGB color space is converted back to CMYK, but with maximum Gray Component Replacement (GCR). Within the CMY color space, practically any hue angle can be achieved by combining two of the three primary colors. The purpose of the third color, commonly referred to as the "graying agent," is to change the hue towards Gray in order to hold detail while darkening and creating depth (i.e., decreasing color saturation and increasing darkness). However, since the graying agent has an inherent hue of its own, it tends to shift the hue as it changes the saturation of the resulting color. The most efficient way to change the saturation of a given color while maintaining the same hue angle is to use the key (Black) component. The act of substituting a quantity of Black for a quantity of the graying agent is known as "Gray Component Replacement." Next, in step 50, colors from the first conversion (i.e., no UCR) are combined with the Black of the second conversion (i.e., maximum GCR). Then, if color correction is deemed necessary, in step 60, color correction is performed to the image, in step 70, to ensure that all colors in the image and page geometry are created with a maximum of three colors—one primary, one complimentary primary and Black. This process can be performed with a variety of image manipulation software options. The number of steps and the process its self may vary depending on the software ability of handling conversions of RGB to CMYK and or Pantone colors. With some conversion software the UCR, the GCR and the Pantone conversion, can be created in one step—instead of two or three steps. The quantity of colors to be printed is not limited, just how many overlap at any given area in the image or page geometry. Selection of colors used to achieve the entire gamut of hues in the original customer file is part of the present Stealth process, but is not limited to the Stealth screening process.

Applying Stealth™ Screening to Continuous Tone Images Only (not Page Geometry)

Figure 2:
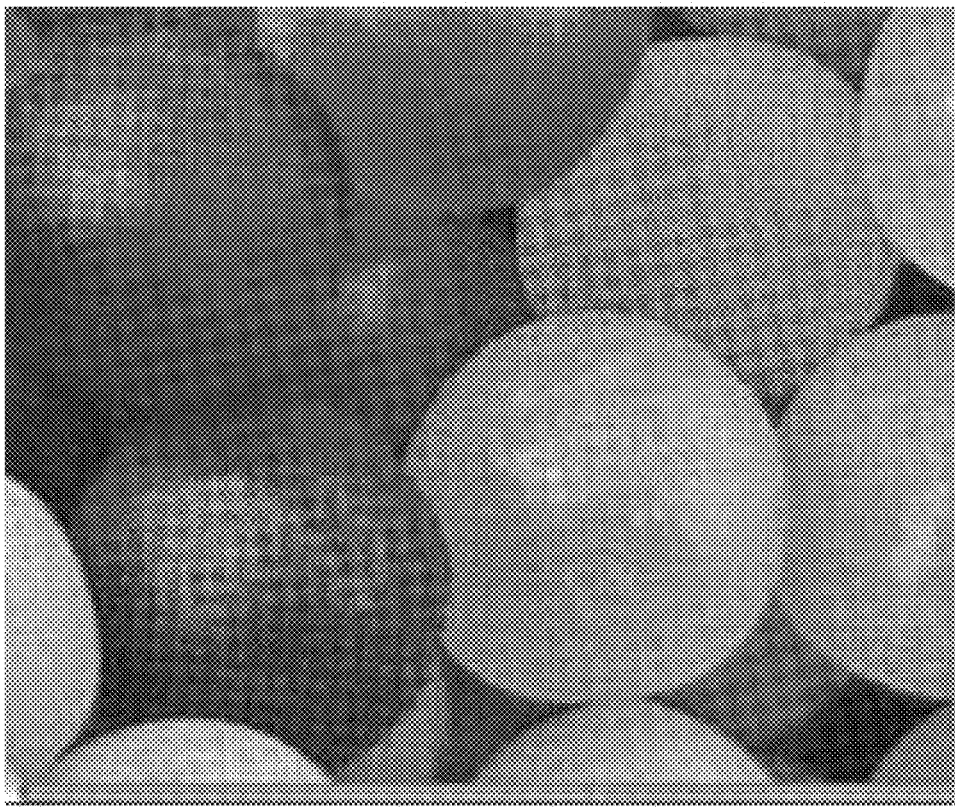
FIG. 2 is a photographic illustrative example of an offensive (Moiré) screen pattern.
Figure 3:
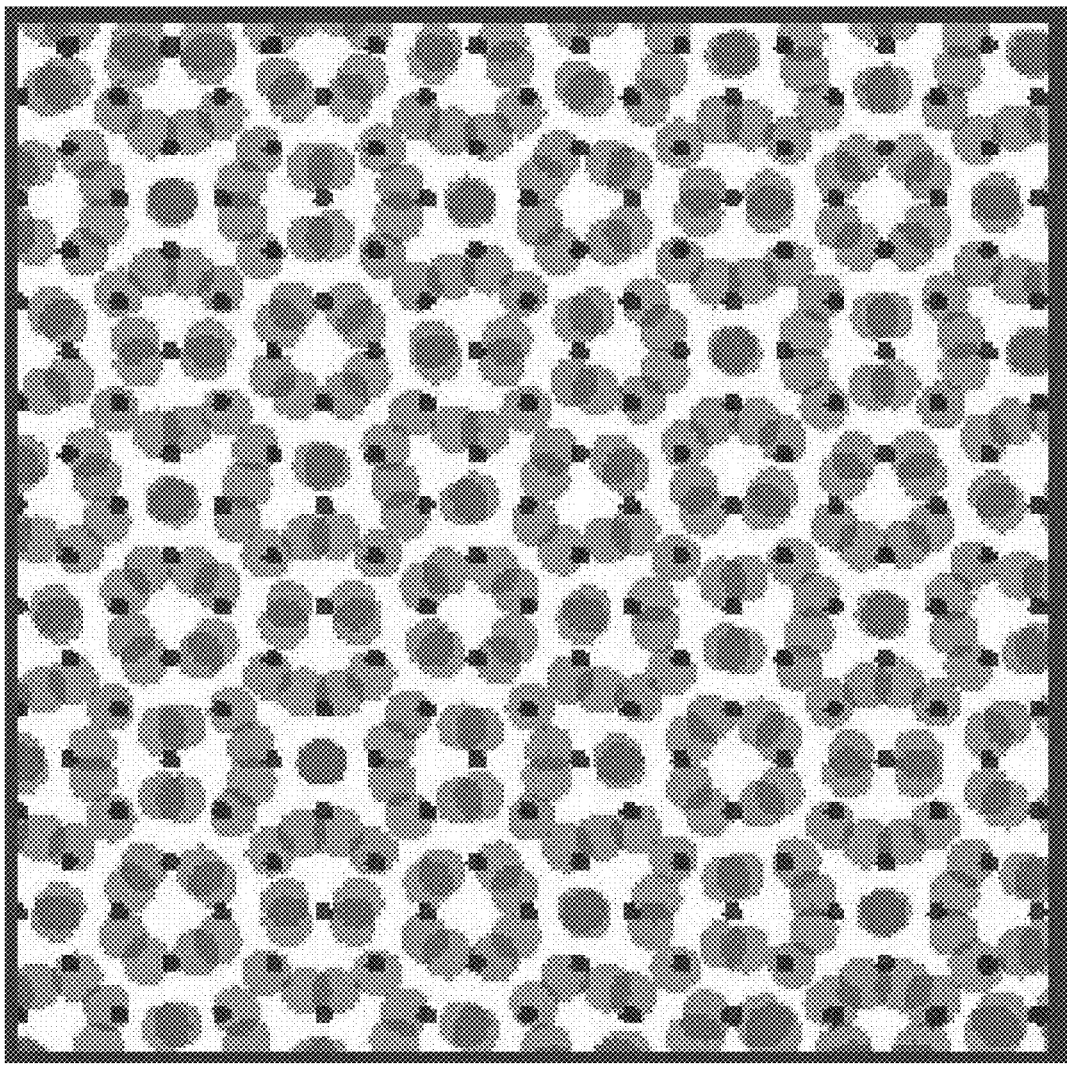
FIG. 3 is a photographic illustrative example of an undesirable rosette pattern, commonly encountered with conventional Dry Offset printing.
Figure 4:
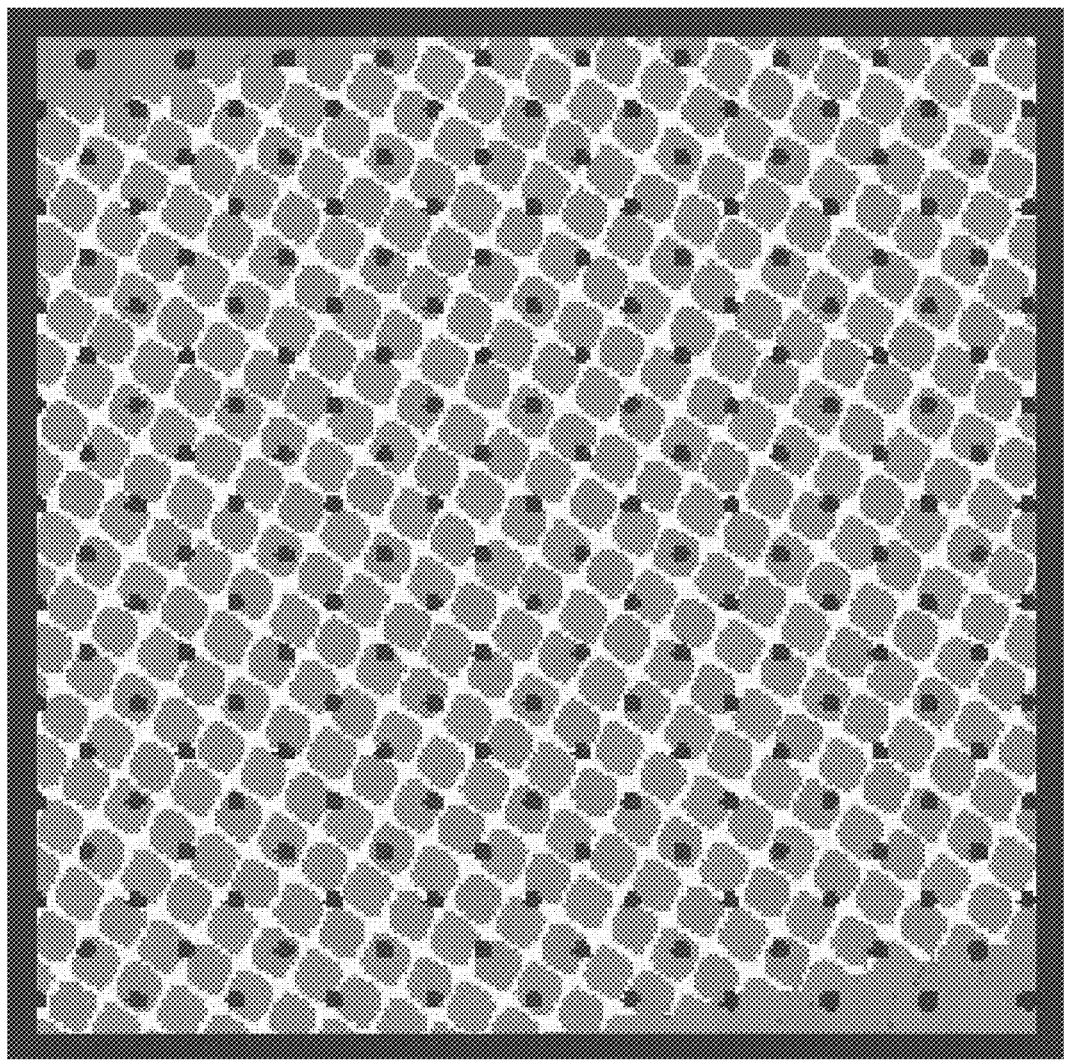
FIG. 4 is a photographic illustrative example of the print of FIG. 3, using the Stealth Screening method of the present invention, shown in same location.
Figure 6A:
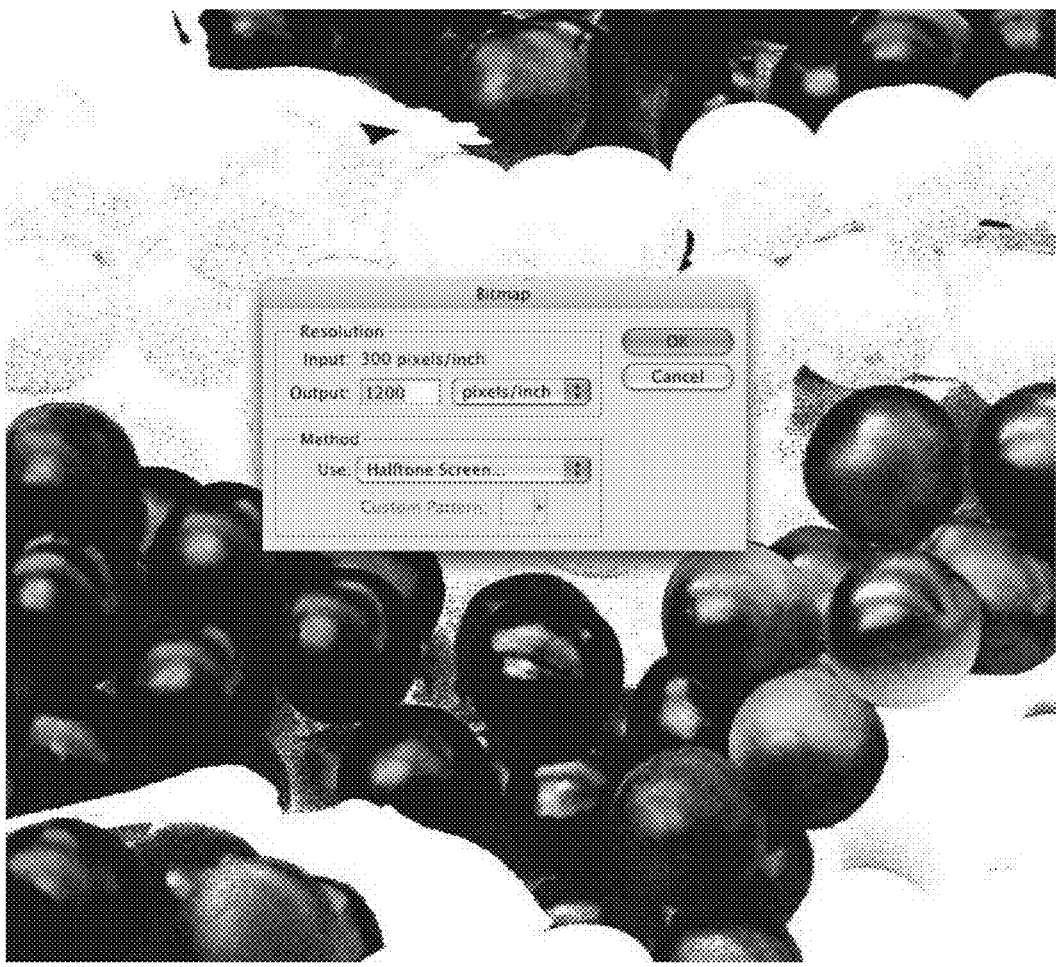
FIGS. 6A and 6B are photographic illustrative examples showing parameters in the software example to convert to a bitmap.
Figure 6B:
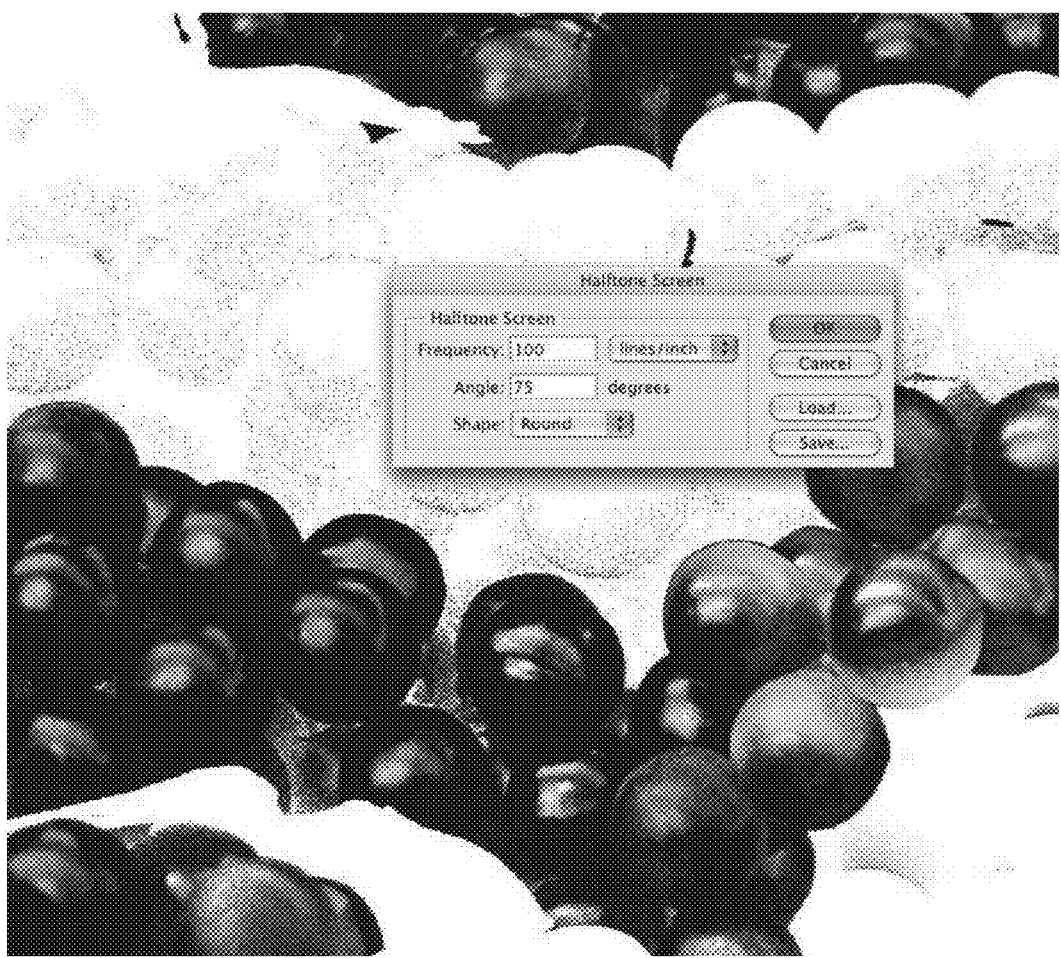
Figure 7:
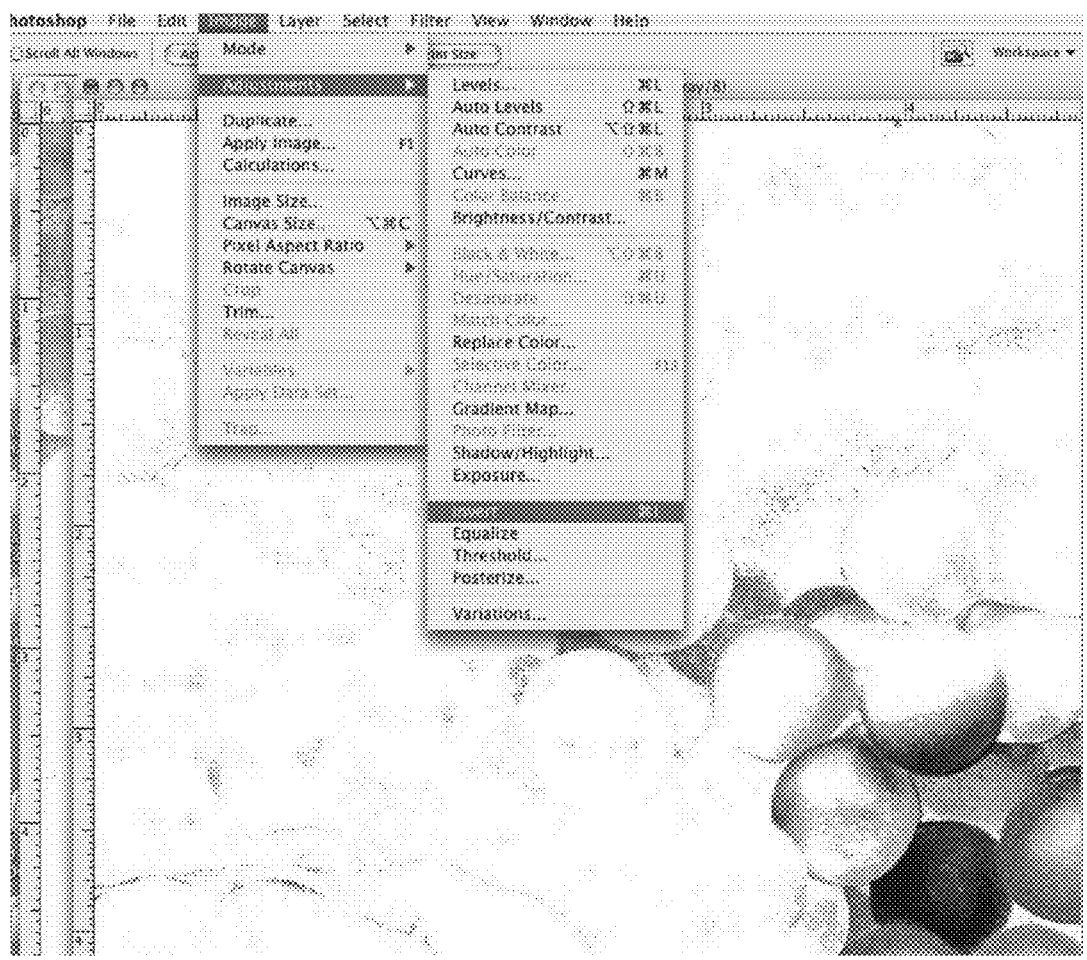
FIG. 7 is an illustrative example showing the step(s) of inverting to a continuous tone bitmap.
Figure 11:
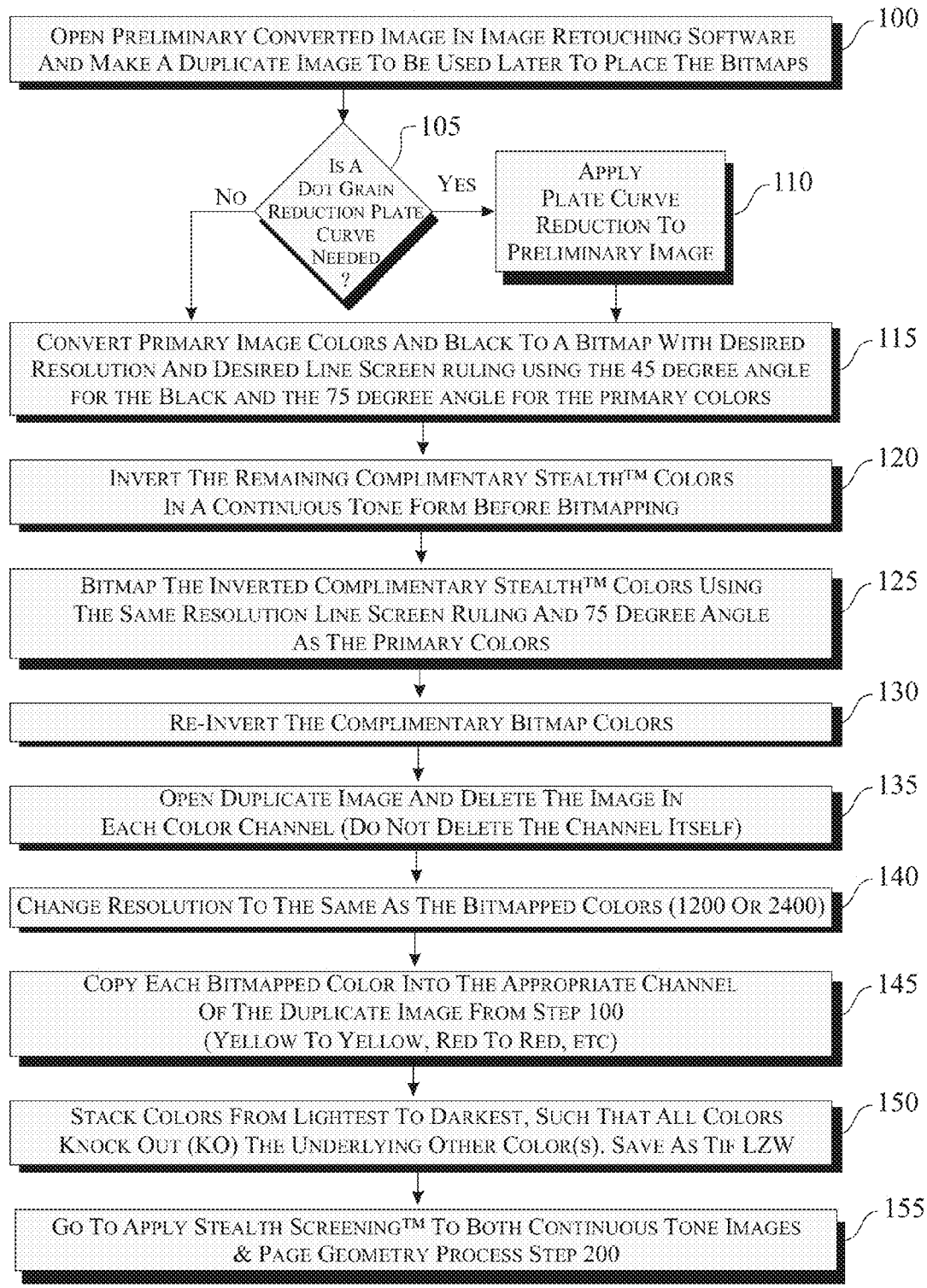
FIG. 11 is a flow chart showing exemplary steps for applying the Stealth screening to continuous tone images only.
Figure 12:
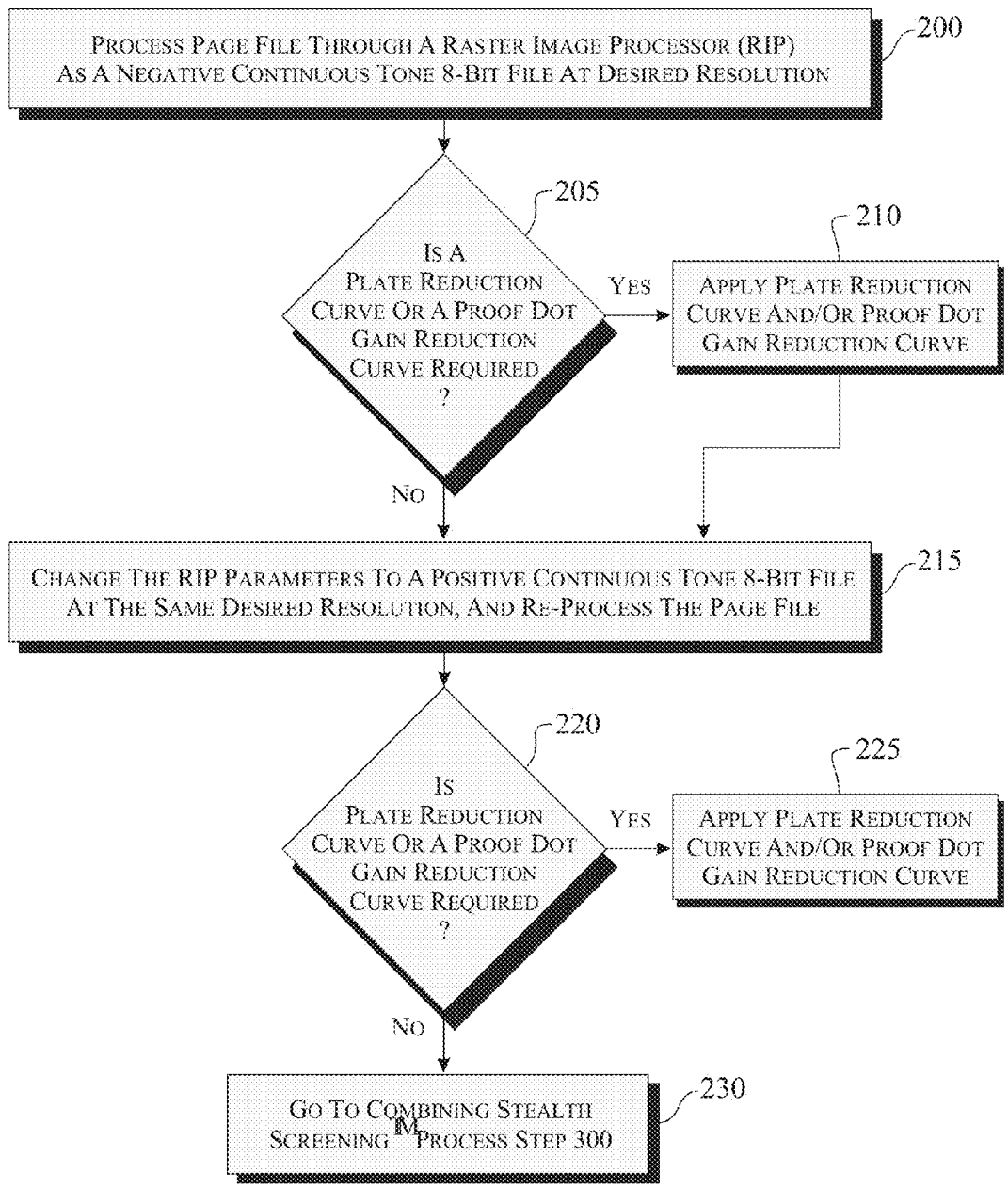
FIG. 12 is a flow chart showing exemplary steps for applying Stealth screening to both continuous tone images and page geometry.
Figure 13:
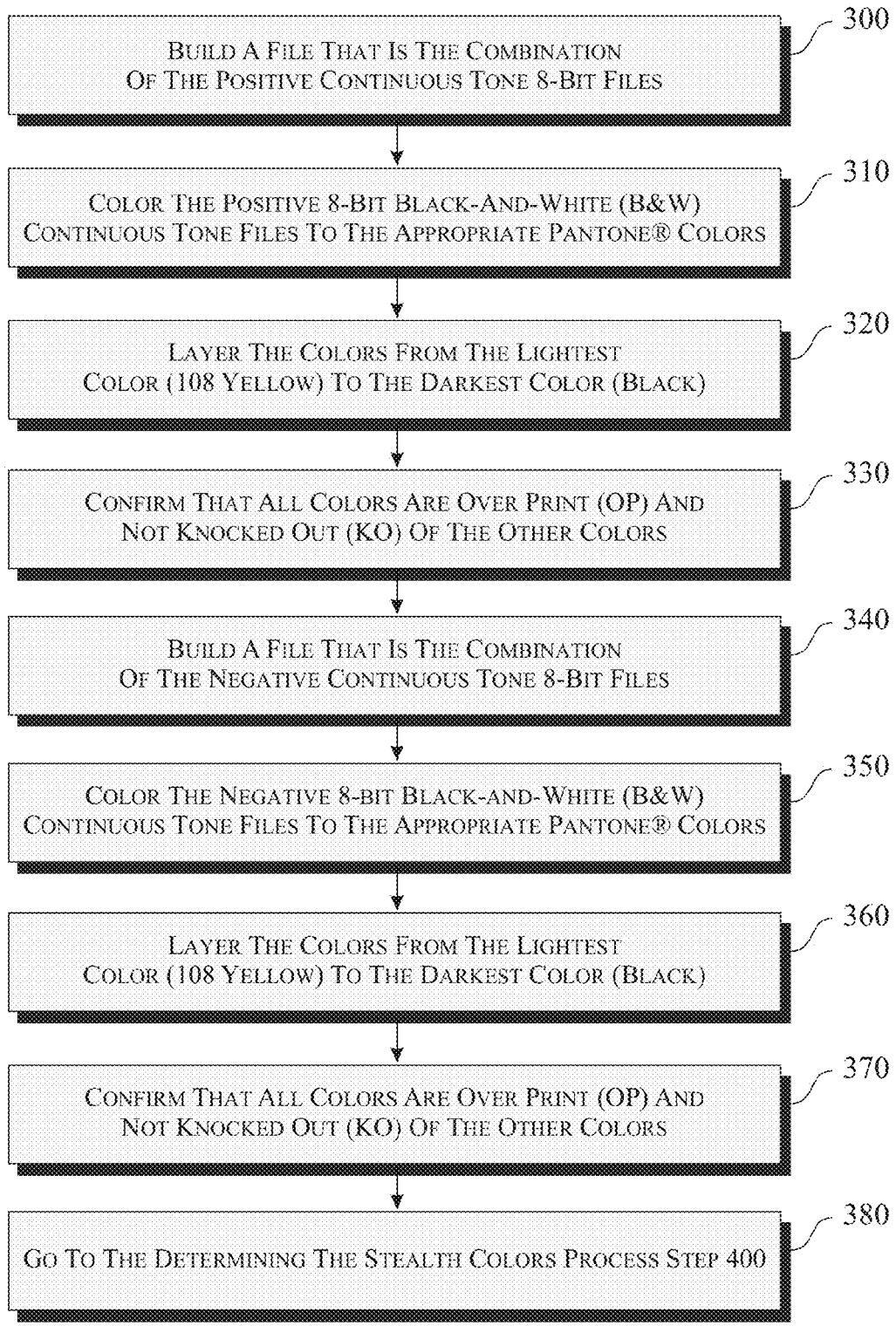
FIG. 13 is a flow chart showing exemplary steps for combining the Stealth screening applied to just the continuous tone images and the Stealth screening applied to both the continuous tone images and the page geometry.
Figure 14:
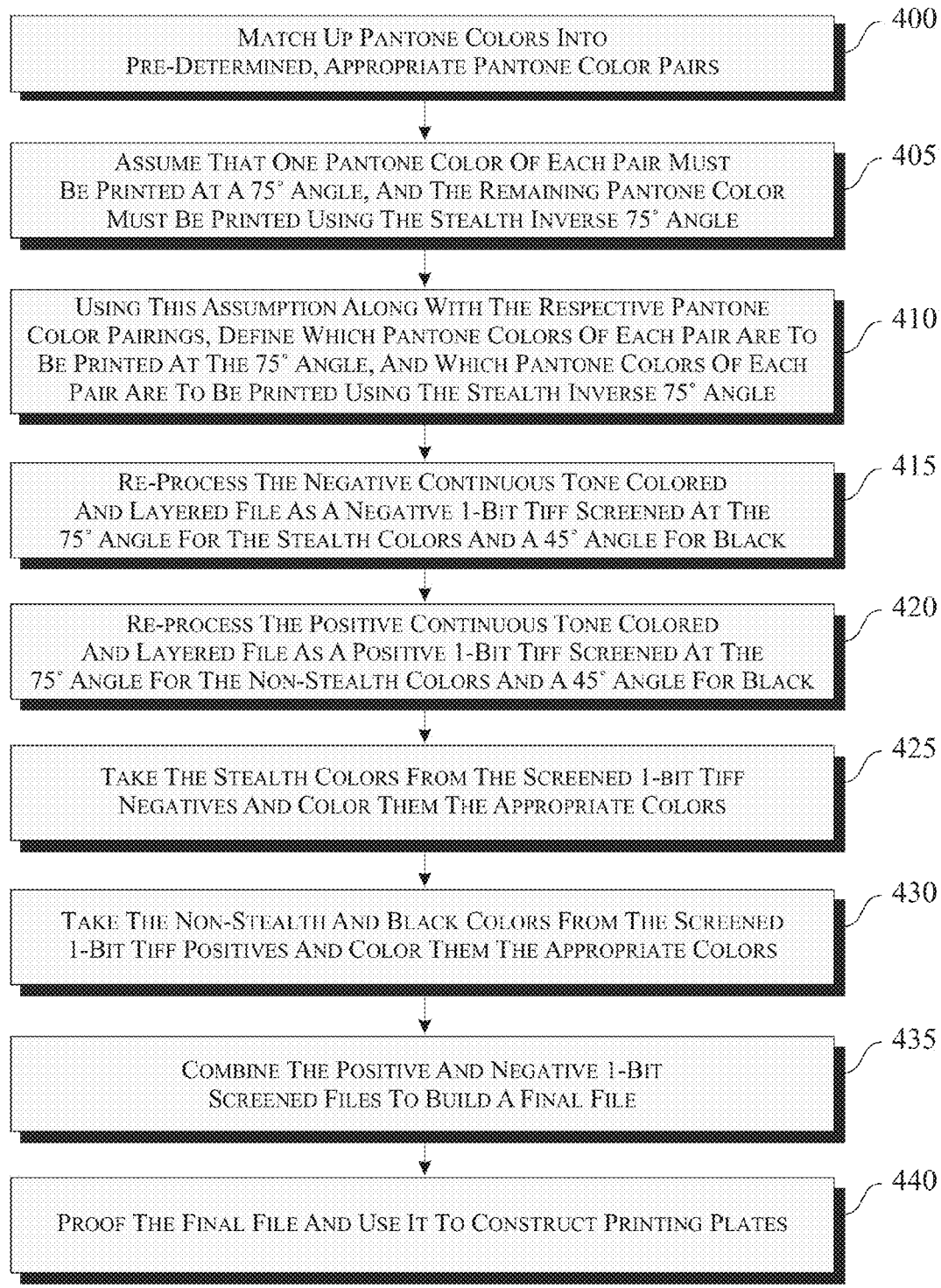
FIG. 14 is flow chart showing exemplary steps for building a final file to be used to construct printing plates.

Referring now primarily to FIG. 11, in step 100 the image is opened, and a duplicate image is created, for subsequent utilization in step 135, using software that can process, create bitmap images, and inverse the image from positive-to-negative and negative-to-positive. This process can be performed within any of a number of known image retouching software products, including, for example, Adobe Photoshop™. In step 105, a determination is made whether or not a plate dot gain reduction curve is required. If so, in step 110, a plate curve reduction (i.e., lightening the image to compensate for dot gain during printing) is applied. Next, in step 115, Primary image colors and Black are converted to a bitmap with a desired resolution and a desired line screen ruling using the 45° angle for the Black and the 75° angle for the Primary colors (see FIGS. 6A and 6B). A The 45° angle is used for the Black, and a 75° angle of used for the other Primary colors; however, any two angles of the four previously mentioned angles can be used, provided they are a full 30° apart. Conventional printing angles differ for all colors, but usually consist of 45°, 75°, 90°) (0° and 105°) (15°, to create a Rosette pattern (see FIG. 3), while minimizing undesirable potential patterns and Moiré's (see FIG. 2). Next, in step 120, the Complimentary Primary Stealth colors are inverted in a continuous form before Bitmapping. Next, in step 125, the inverted Stealth Complimentary colors are bitmapped using the identical resolution, line screen ruling, and 75° angle (see FIGS. 6A and 6B). Next, in step 130, the Complimentary Stealth bitmap colors are re-inverted. Then, in step 135, the duplicate image is opened and the image in each color channel (not the channel itself) is deleted. Next, in step 140, the resolution of the duplicate image from step 100 is changed to the same resolution as the bitmap colors (i.e., 1200 dpi or 2400 dpi). Next, in step 145, each bitmap color is copied into the appropriate channel of the duplicate image (e.g., Yellow to Yellow, Red to Red, and so on), with the process continued in this fashion for the balance of the colors, which can be virtually unlimited; however, most Dry Offset printing presses are nine (9) colors or less.

Figure 8:
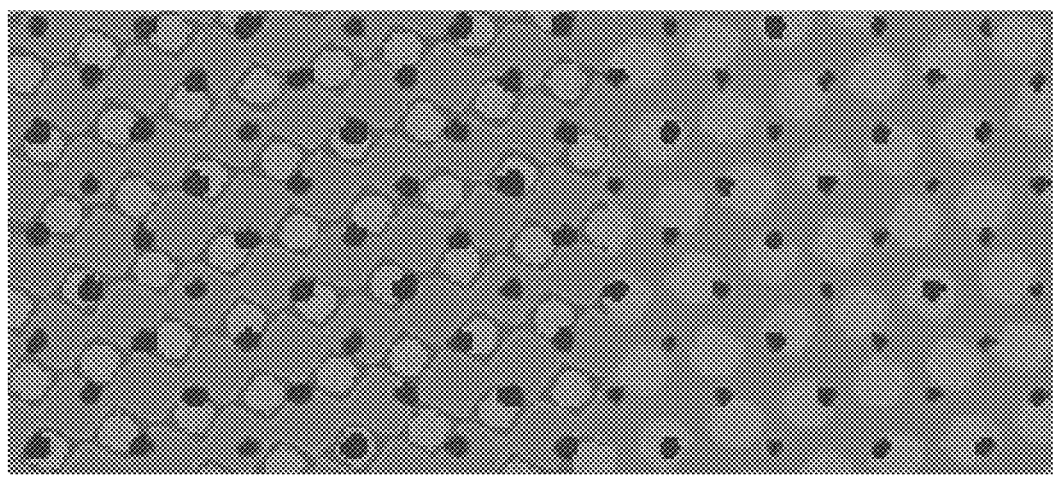
FIG. 8 is an illustrative example comparing Over Print (on the left) and Knock Out (on the right)

Finally, when there are no additional colors to process, colors are stacked, from lightest to darkest, and all colors knock out the lighter colors underneath, with Black layered last and knocking out all colors preceding it, in step 150 and save image as a Tiff LZW (Lempel-Ziv-Welch), a lossless compression format. This layering and knock out will eliminate any possible ink contamination where there is a total ink density of over 100%. An example of this can be seen in FIG. 8, where the Green dot is 50% and the Blue dot is 70% (totaling 120%). As illustrated, after the layering and knock out, the green dot is clipped to fit inside of the darker color Blue opening. This maximizes print contrast and eliminates ink contamination. Subsequently, in step 155, we move to the application of Stealth Screening to both continuous tone images and page geometry, in step 200.

Applying Stealth Screening to Continuous Tone Images & Page Geometry

Figure 5:
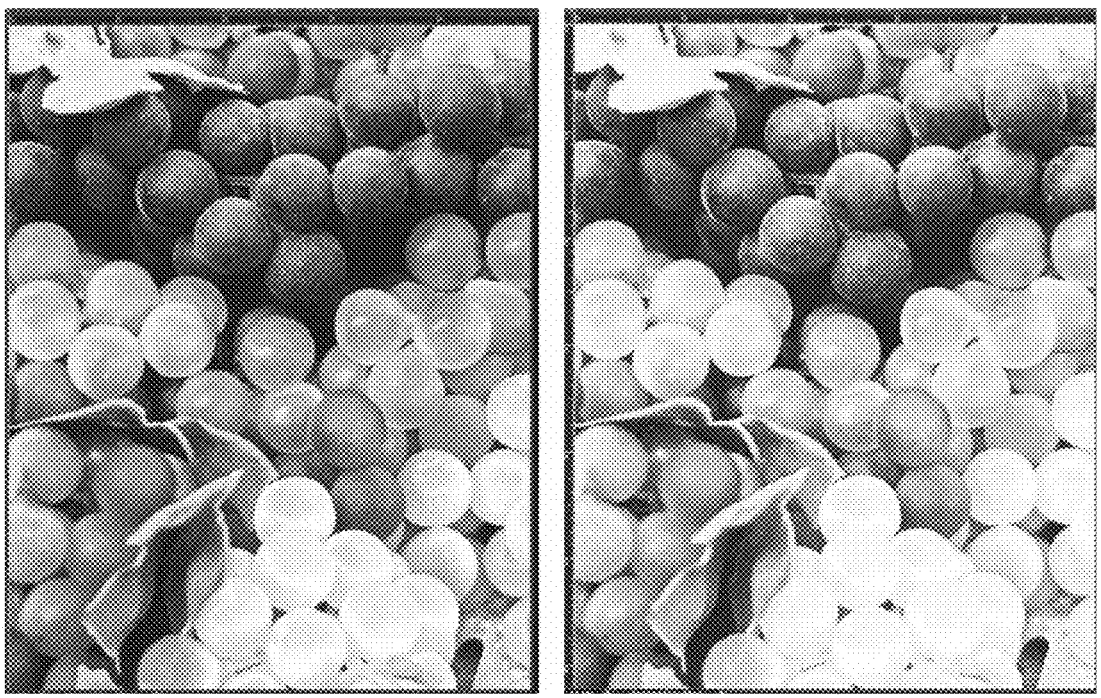
FIG. 5 is a photographic illustrative example of a continuous tone image comparing no curve (left image) and a negative 20% plate curve (right image)

In step 200, the page file is processed through a Raster Image Processor (RIP) as a negative continuous tone 8-bit file at a desired resolution. A raster image processor (RIP) is a component used in a printing system which produces a raster image (also known as a bitmap). The bitmap is then sent to a printing device for output. The input may be a page description in a high-level page description language such as Post- Script, Portable Document Format, XPS or another bitmap of higher or lower resolution than the output device. In the latter case, the RIP applies either smoothing or interpolation algorithms to the input bitmap to generate the output bitmap. Raster image processing is the process and the means of turning vector digital information such as a PostScript file into a high-resolution raster image. Each color will be a negative individual continuous tone Black and White image. In step 205, a decision is made whether or not plate Reduction curve or proof dot gain curve is required. In step 210, if a plate or proof dot gain reduction curve is needed (e.g., mid-tones (20%), see FIG. 5, which has a 20% dot gain reduction), it is applied at this stage. Next, in step 215, this process is repeated, changing the RIP parameters to positive continuous tone 8-bit file at the desired resolution. Each color will be a positive individual continuous tone Black and White image. Then, in step 220, a decision is made regarding reduction curve requirements (same as in step 205) and, if needed, appropriate reduction curve is applied in step 225 (same as in step 210). Next, in step 230, the method proceeds to the Combining Stealth Screening process.

Combining Stealth Screenings

Figure 9:
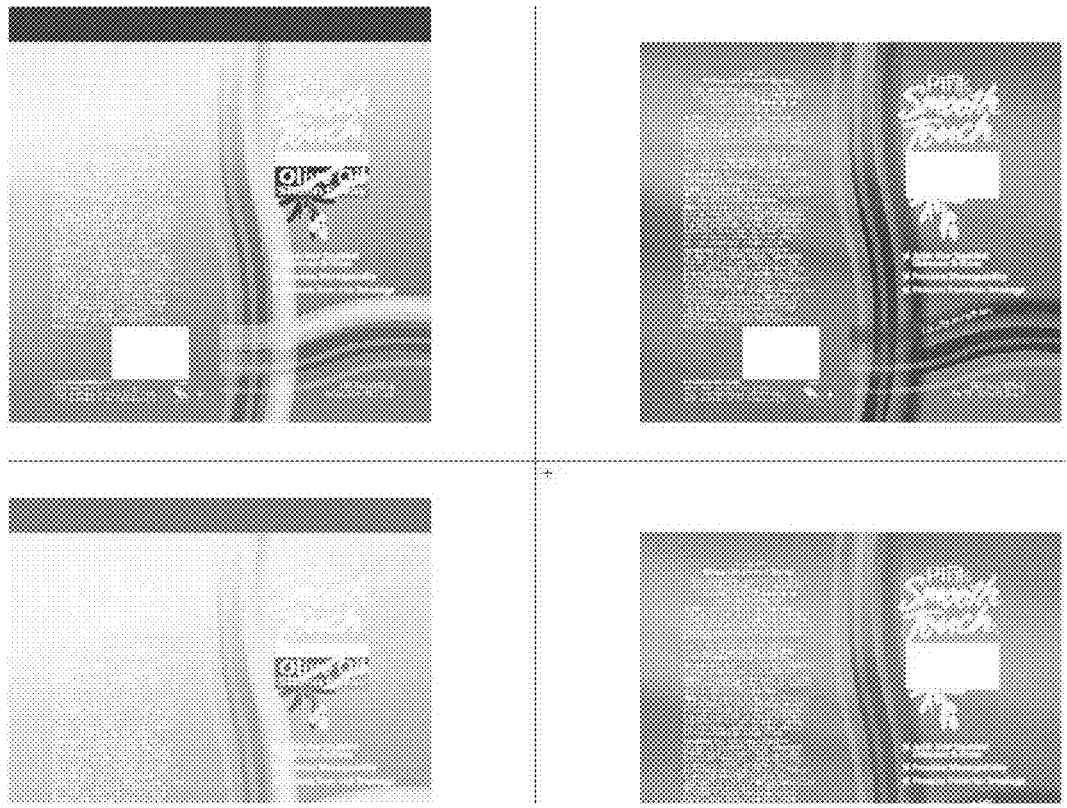
FIG. 9 is an illustrative example showing the step(s) of colorization of a B&W 1 bit to the appropriate color using page assembly software.

Initially, a file that is the combination of the 8-bit positives is constructed in step 300. In step 310, the positive 8-bit Black and White continuous tone files are colored the appropriate Pantone colors (see FIG. 9). Then, in step 320, these colors are layered on top of each other from lightest (108 Yellow) to darkest (Black). In step 330, it must be confirmed that all colors are Over Print (OP) and not a Knock-Out (KO) of the other colors. Next, in step 340, a file that is the combination of the 8-bit continuous tone negatives is constructed. In step 350, the 8-bit Black and White continuous tone negative files are colored the appropriate Pantone colors. Then, in step 360, these colors are layered on top of each other from lightest (108 Yellow) to darkest (Black). In step 370, confirmation is made that all colors are Over Print and not Knocked Out of the other colors. Finally, in step 380, we proceed to the Determining Stealth Colors process.

Determining Stealth Colors

At this point it will be necessary to determine which colors will be screened at the 45° angle and which colors will be screened at the 75° angle, and then which colors will be using the Stealth inverse 75° angles. Initially, in step 400, the Pantone colors are matched up into Pantone color pairs. Next, in step 405, an assumption is made that one Pantone color of each color pair must be printed at a 75° angle, and the remaining Pantone color (i.e., complementary primary) of the respective pair must be printed using the Stealth inverse 75° angle. Next, in step 410, using this assumption, along with the respective Pantone color pairings, we define which Pantone colors of each pair are to be printed at the 75° angle, and which Pantone colors of each pair are to be printed at the Stealth inverse 75° angle. Next, in step 415, the negative continuous tone colored and layered file is re-processed as a negative 1-bit Tiff screened at the 75° angle for the Stealth colors and at 45° angle for Black. Next, in step 420, the positive continuous tone colored and layered file is re-processed as a positive 1-bit Tiff screened at the 75° angle for the non-Stealth colors and at a 45° angle for Black. Next, in step 425, the Stealth colors from the screened 1-bit Tiff negatives are colored the appropriate colors and, in step 430, the non-Stealth and Black colors from the screened 1-bit Tiff positives are colored the appropriate colors. Next, in step 430, the positive and negative 1-bit screened files are combined to build a final file. Finally, in step 440, the final file is proofed and used to construct printing plates.

An example of steps 400 through 440 follows. For demonstration purposes, the following six (6) colors will be used: Pantone 108 Yellow, Pantone 185 Red, Pantone 361 Green, Pantone Blue, Pantone 072 dark Blue, and Black. The following assumptions will be made, based on the colors picked and the original subject matter. The two primary colors to make up our flesh tones (Reds, Oranges and Yellows) will be 108 Yellow and 185 Red. This means that one of these two colors must be the 75° angle and the other primary color will be the Stealth inverse 75° angle. The two primary colors to make up our light greens will be 108 Yellow and 361 Green. Therefore, one of these two colors must be the 75° angle and the other must be the Stealth inverse 75° angle. The two primary colors that will make up our dark Greens will be Pantone Blue and 361 Green. This means one of these two colors must be the 75° angle and the other must be the Stealth inverse 75° angle. The two primary colors to make up our Cyan and Blues will be the Pantone Blue and 072 Blue. This means one of these two colors must be the 75° angle and the other color must be the Stealth inverse 75° angle. The Black will be used in combination with all of the primary colors and will be screened at a 45° angle.

The negative continuous tone colored and layered file will need to be re-processed as a negative 1-bit Tiff, screened at the 75° angle for the Stealth Colors (Pantone 108 Yellow and Pantone Blue). The positive continuous tone colored and layered file will need to be re-processed as a positive 1-bit Tiff, screened for the remaining non-Stealth colors (185 Red, 361 Green, 072 Blue and Black). All non-Stealth colors (185 Red, 361 Green, and 072 Blue) except the Black need to be screened at the 75° angle. The Black needs to be screened at the 45 degree angle.

At this point we need to build the final file from the combination of the positive and negative 1-bit screened files. We take the Stealth 108 Pantone Yellow and Pantone Blue from the screened 1-bit Tiff negatives and color them the appropriate color. We take the 185 Red, 361 Green, 072 Blue, and Black from the 1-bit screened positives and color them the appropriate color.

Based upon the criteria above, the angle and overprint knock out should be as follow: The 108 Yellow should be the first color down in layering and the print angle should be 75° angle Stealth. The 185 Red should be the second color down with a 75° normal angle and should knock out the 108 Yellow underneath it. The 361 Green should be the third color down with a 75° normal angle and should knock out the 108 Yellow and 185 Red (note: there should not be any 185 Red under the 361 Green if the file was built correctly). Red is not a primary color to make green, so it should be replaced with the Black. The fourth color down should be the Pantone Blue on the 75° Stealth angle and should knock out the 108 Yellow, the 185 Red and the 361 Green underneath it (note: there should not be any Pantone 108 Yellow and 185 Red underneath the Pantone Blue if the file was built correctly). The fifth color down should be the 072 Blue and should be printed at the 75° normal angle, knocking out the Pantone 108 Yellow, 185 Red, 361 Green and Blue (note: there should not be any Yellow/Red/Green under this color if the file was built correctly). The final color down would be the Black, and it should knock out all colors underneath it—maintaining the darkening and detail of all the primary colors.

This file is now ready to proof and or make plates. It is recommended that the plate making process be laser ablation ($CO_2$ laser engraved) which will be able to image high light dots slightly below the surface Reducing dot gain and break-offs; however, it is not mandatory to achieve the Stealth™ results. If laser ablative plates are not used, it is recommended that the full range Black be screened with some form of a dithered high light dot to avoid potential hard break-offs in the 1% to 3% dot area on the printed piece.

While the preferred embodiments of the invention have been described above, it will be recognized and understood that various modifications can be made in the invention and the appended claims are intended to cover all such modifications which may fall within the spirit and scope of the invention.

What is claimed is:

1. A halftone screening method for Dry Offset printing, comprising the steps of:
    converting an original customer-supplied file into a desired continuous tone color space, the customer-supplied file including continuous tone images and a page geometry by accomplishing the following steps:
        converting the file image and page geometry from Cyan/Magenta/Yellow/Black (CMYK) to Red/Green/Blue (RGB) color space,
        converting the RGB back to CMYK with maximum ink density and no Under Color Removal (UCR),
        converting the RGB to CMYK again, but with maximum Gray Component Replacement (GCR), and
        combining the colors from the second and third conversion steps;
    subjecting the continuous tone images only to a screening process;
    subjecting both the continuous tone images and the page geometry to a screening process;
    combining the screening applied to just the continuous tone images and the screening applied to both the continuous tone images and the page geometry;
    constructing a final file, using the combined screenings, wherein, the final file is a useful form to construct printing plates.

2. A halftone screening method for Dry Offset printing as recited in claim 1, wherein the step of combining the screening applied to just the continuous tone images and the screening applied to both the continuous tone images and the page geometry, further comprises the steps of:
    building a file that is a combination of positive continuous tone 8-bit files;
    coloring positive 8-bit Black-and-White continuous tone files to a determined appropriate Pantone colors;
    layering the colors from lightest to darkest;
    confirming that all colors are Over Print (OP) and not Knocked Out (KO) of the other colors;
    building a file that is a combination of negative continuous tone 8-bit files;
    coloring negative 8-bit Black-and-White continuous tone files to the appropriate Pantone colors;
    layering the colors from lightest to darkest; and
    confirming that all colors are Over Print (OP) and not Knocked Out (KO) of the other colors.

3. A halftone screening method for Dry Offset printing as recited in claim 2, wherein the step of constructing a final file further comprises the steps of:
    matching up the Pantone colors into predetermined, appropriate color pairs;
    establishing that a first color of the color pair is to be printed at a 75° angle and a second color of the color pair is to be printed using an inverse 75° angle;
    determining which colors are to be printed at the 75° angle and which colors are to be printed at the inverse 75° angle;
    re-processing the negative continuous tone colored and layered file as a negative 1-bit Tiff screened at the inverse 75° angle for colors determined to be the Stealth colors and a 45° angle for Black;
    re-processing the positive continuous tone colored and layered file as a positive 1-bit Tiff screened at the 75° angle for the non-Stealth colors and a 45° angle for Black;
    coloring the Stealth colors from the screened 1-bit Tiff negatives predetermined appropriate colors;
    coloring the non-Stealth colors and Black from the screened 1-bit positives predetermined appropriate colors;
    combining the positive and negative 1-bit screened files to construct a final file; and,
    proofing and using the final file to construct printing plates.

4. A halftone screening method for Dry Offset printing, comprising the steps of:
    converting an original customer-supplied file into a desired continuous tone color space, the customer-supplied file including continuous tone images and a page geometry;
    subjecting the continuous tone images only to a screening process in accordance with the following steps:
        opening a file image with a retouching software,
        converting the image to a bitmap, using a 45° print angle for Black and using a 75° print angle for non-Black colors, such that all image locations include a combination of two primary colors and Black,
        processing a first one of the two primary colors as if it were Black, but using a 75° print angle,
        inverting a second one of the two primary colors in a continuous tone format,
        bitmapping the second primary color at a 75° print angle, and
        re-inverting the second primary color and stacking the colors from lightest to darkest;
    subjecting both the continuous tone images and the page geometry to a screening process;
    combining the screening applied to just the continuous tone images and the screening applied to both the continuous tone images and the page geometry; and
    constructing a final file, using the combined screenings, wherein, the final file is a useful form to construct printing plates.

5. A halftone screening method for Dry Offset printing as recited in claim 4, wherein the step of combining the screening applied to just the continuous tone images and the screening applied to both the continuous tone images and the page geometry, further comprises the steps of:
    building a file that is a combination of positive continuous tone 8-bit files;
    coloring positive 8-bit Black-and-White continuous tone files to a determined appropriate Pantone colors;
    layering the colors from lightest to darkest;
    confirming that all colors are Over Print (OP) and not Knocked Out (KO) of the other colors;
    building a file that is a combination of negative continuous tone 8-bit files;
    coloring negative 8-bit Black-and-White continuous tone files to the appropriate Pantone colors;
    layering the colors from lightest to darkest; and
    confirming that all colors are Over Print (OP) and not Knocked Out (KO) of the other colors.

6. A halftone screening method for Dry Offset printing as recited in claim 5, wherein the step of constructing a final file further comprises the steps of:
    matching up the Pantone colors into predetermined, appropriate color pairs;

establishing that a first color of the color pair is to be printed at a 75° angle and a second color of the color pair is to be printed using an inverse 75° angle;

determining which colors are to be printed at the 75° angle and which colors are to be printed at the inverse 75° angle;

re-processing the negative continuous tone colored and layered file as a negative 1-bit Tiff screened at the inverse 75° angle for colors determined to be the Stealth colors and a 45° angle for Black;

re-processing the positive continuous tone colored and layered file as a positive 1-bit Tiff screened at the 75° angle for the non-Stealth colors and a 45° angle for Black;

coloring the Stealth colors from the screened 1-bit Tiff negatives predetermined appropriate colors;

coloring the non-Stealth colors and Black from the screened 1-bit positives predetermined appropriate colors;

combining the positive and negative 1-bit screened files to construct a final file; and, proofing and using the final file to construct printing plates.

7. A halftone screening method for Dry Offset printing, comprising the steps of:

converting an original customer-supplied file into a desired continuous tone color space, the customer-supplied file including continuous tone images and a page geometry;

subjecting the continuous tone images only to a screening process;

subjecting both the continuous tone images and the page geometry to a screening process in accordance with the following steps:

processing a page file through a Raster Image Processor (RIP) as a negative continuous tone 8-bit file at a desired resolution, determining whether or not plate reduction curve or proof dot reduction curve are required and, if so, applying at least one of said reduction curves, changing the RIP parameters to a positive continuous tone 8-bit file at said desired resolution and re-processing said page file through said changed RIP, and determining, again, whether or not plate reduction curve or proof dot reduction curve are required and, if so, applying at least on of said reduction curves;

combining the screening applied to just the continuous tone images and the screening applied to both the continuous tone images and the page geometry; and constructing a final file, using the combined screenings, wherein, the final file is a useful form to construct printing plates.

8. A halftone screening method for Dry Offset printing as recited in claim 7, wherein the step of combining the screening applied to just the continuous tone images and the screening applied to both the continuous tone images and the page geometry, further comprises the steps of:

building a file that is a combination of positive continuous tone 8-bit files;

coloring positive 8-bit Black-and-White continuous tone files to a determined appropriate Pantone colors;

layering the colors from lightest to darkest;

confirming that all colors are Over Print (OP) and not Knocked Out (KO) of the other colors;

building a file that is a combination of negative continuous tone 8-bit files;

coloring negative 8-bit Black-and-White continuous tone files to the appropriate Pantone colors;

layering the colors from lightest to darkest; and confirming that all colors are Over Print (OP) and not Knocked Out (KO) of the other colors.

9. A halftone screening method for Dry Offset printing as recited in claim 8, wherein the step of constructing a final file further comprises the steps of:

matching up the Pantone colors into predetermined, appropriate color pairs;

establishing that a first color of the color pair is to be printed at a 75° angle and a second color of the color pair is to be printed using an inverse 75° angle;

determining which colors are to be printed at the 75° angle and which colors are to be printed at the inverse 75° angle;

re-processing the negative continuous tone colored and layered file as a negative 1-bit Tiff screened at the inverse 75° angle for colors determined to be the Stealth colors and a 45° angle for Black;

re-processing the positive continuous tone colored and layered file as a positive 1-bit Tiff screened at the 75° angle for the non-Stealth colors and a 45° angle for Black;

coloring the Stealth colors from the screened 1-bit Tiff negatives predetermined appropriate colors;

coloring the non-Stealth colors and Black from the screened 1-bit positives predetermined appropriate colors;

combining the positive and negative 1-bit screened files to construct a final file; and, proofing and using the final file to construct printing plates.

* * * * *